United States Patent [19]

Chak et al.

[11] Patent Number: 4,710,282

[45] Date of Patent: Dec. 1, 1987

[54] DEVICE FOR SILIVERIZING RUNNING WATER

[76] Inventors: Maryan Chak, 483 Ocean Pkwy., Brooklyn, N.Y. 11218; Moisey Dobruskin, 2901 Ocean Pkwy., Brooklyn, N.Y. 11235

[21] Appl. No.: 894,900

[22] Filed: Aug. 8, 1986

[51] Int. Cl.⁴ .................... C25B 9/00; C25B 11/03; C25B 11/04
[52] U.S. Cl. .................... 204/228; 204/229; 204/272; 204/284; 204/292
[58] Field of Search ............... 204/149, 273, 275, 272, 204/292, 284, 228–229, 269

[56] References Cited

U.S. PATENT DOCUMENTS

| | | | |
|---|---|---|---|
| 3,095,365 | 6/1963 | Green | 204/229 |
| 3,654,119 | 4/1972 | White et al. | 204/228 |
| 3,728,245 | 4/1973 | Preis et al. | 204/275 |
| 3,933,606 | 1/1976 | Harms | 204/149 X |
| 4,061,556 | 12/1977 | Reis et al. | 204/275 X |
| 4,451,341 | 5/1984 | Miller | 204/229 X |

*Primary Examiner*—Donald R. Valentine
*Attorney, Agent, or Firm*—Ilya Zborovsky

[57] ABSTRACT

A running water passes through a passage from its inlet to its outlet and is guided by at least two electrodes so that it repeatedly changes its direction to flow transversely to and along the electrodes to be continuously saturated during its running by silver ions emerging from an anode.

22 Claims, 21 Drawing Figures

DEVICE FOR SILIVERIZING RUNNING WATER

BACKGROUND OF THE INVENTION

The present invention relates to a device for and a method of silverizing water, and in particular running water.

Healing property of silverized water is well known and has been used by mankind over centuries. Rich and powerful people as well as religious representatives used silver dishes for eating and drinking as well as for rituals. Numerous researches established that silver and in particular ions of silver possess bactericidal activity, since prothoplasm of bacteria has a negative charge and therefore attracts positively charged silver ions. Silver is a microelement which is vitally important for human organism. Silver participates in physiocolgical processes and stimulates immunological defence forces. It is known to produce silverized water by electrolysis which has a higher bactericidal activity than water which is silverized by a simple contact with silver. This method includes introduction of water into a closed container with silver-containing electrodes and performing the electrolythic saturation of stagnant water in the container with ions of silver. The above method possesses considerable disadvantage in that the process of saturation is not continuous, and water is produced by discrete dosages. The method does not allow fast, continuous and effective saturation of water with silver ions, and particularly saturation of running water.

SUMMARY OF THE INVENTION

Accordingly, it is an object of the present invention to provide a device for and a method of silverizing water, which avoids the disadvantages of the prior art.

More particularly, it is an object of the present invention to provide a device for and a method of silverizing water, in accordance with which water and especially running water can be saturated with silver ions fast, continuously and effectively.

In keeping with these objects and with others which will become apparent hereinafter, one feature of the present invention resides, briefly stated, in a device and a method in accordance with which water passes in a passage from its inlet to its outlet and the electrodes which includes at least one silver-containing anode and at least one cathode are formed and arranged so that during passing the water is guided by the electrodes to repeatedly change its direction so as to flow transversely to and along the electrodes to be continuously saturated by ions of silver emerging from the anode.

When the device is designed and the method is performed in accordance with the present invention, running water can run through the passage and be continuously, fast and effectively saturated by a desired quantity of silver or silver ions.

The novel feature of the present invention will be set forth in particular in the appended claims. The invention itself will be, however, best understood from the following description of preferred embodiments which is accompanied by the following drawings.

BRIEF DESCRIPTION OF THE DRAWINGS

FIG. 12a, 12b and 12c show a perspective view of another modification, a top view of its body;

FIG. 13 shows a general view of still a further modification of the device; and

DESCRIPTION OF PREFERRED EMBODIMENTS

A device for silverizing water in accordance with the present invention as shown in FIGS. 1–6 has a main housing 1, an auxiliary housing 2 for an electronic circuit which is connected with the main housing 1, and a connecting pipe 3 which can be connected by threaded connection to a water source, for example a faucet. A light emitting diode indicator 4 is provided on the housing 2. A pressure switch 5 senses the pressure of water and activates current supply to electrodes. A thermoregulator sensor 9 senses the temperature of water and regulates current intensity in dependence upon the sensed temperature. Positive electrodes 9, 11, 13, 15, 17 are arranged in an alternating order with negative electrodes 10, 12, 14, 16, 18 and located in the main housing 1 so that the latter tightly surrounds the outer periphery of the disc-shaped electrodes. Positive feeding busses 6 and negative feeding busses 7 connect the respective electrodes with one another and with electric circuit. An upper opening forms an inlet into the main housing and a lower opening forms an outlet in the main housing as shown in FIG. 4a.

Figure 3:
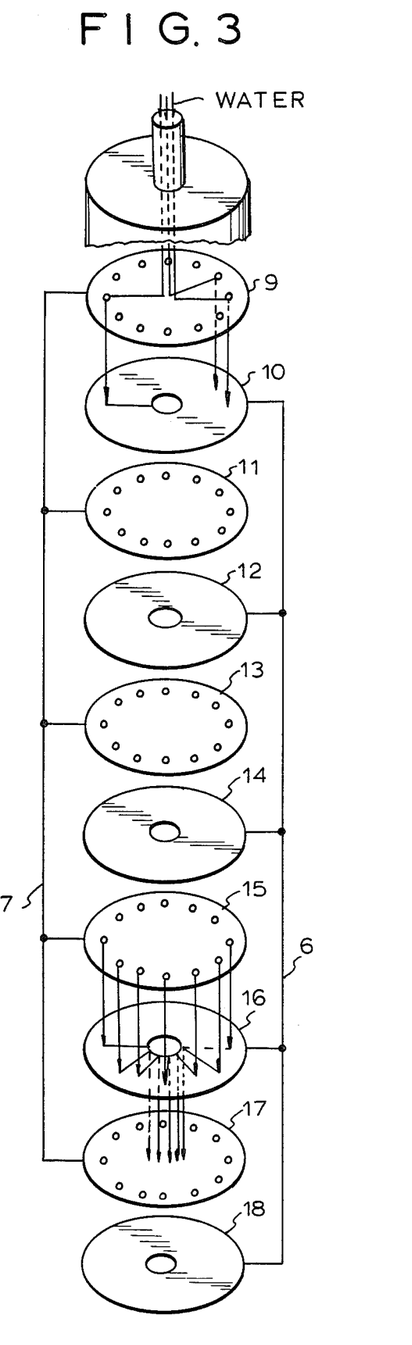
FIG. 3 is a view schematically showing the interior of the device of FIGS. 1 and 2.
Figure 4A:
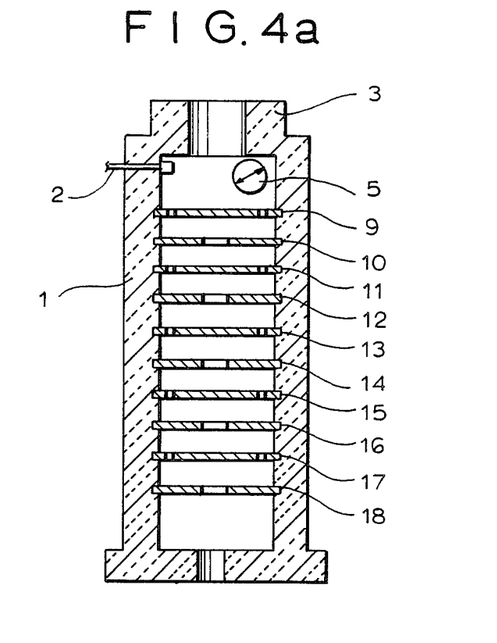
FIGS. 4a and 4b are views showing a vertical section and a top view of a main part of the inventive device.
Figure 4B:
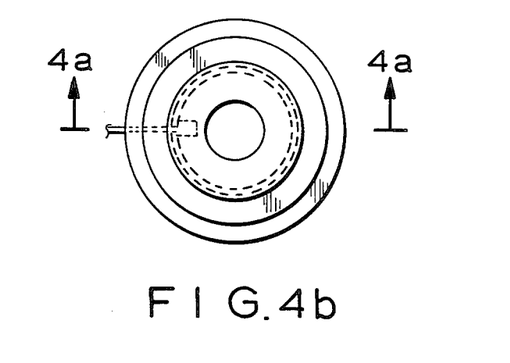
Figure 5:
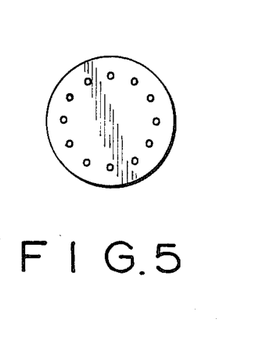
FIGS. 5 and 6 are views showing two electrodes of the inventive device.
Figure 6:
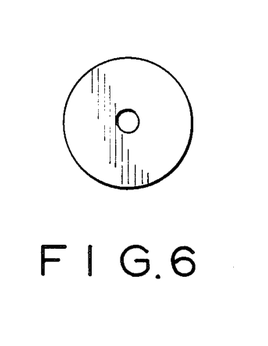

As can be seen from FIG. 3 the electrodes having different charges also have different design. The positive electrodes are provided with a plurality of peripheral openings, while the negative electrodes are provided with a single central opening. Of course this can also be reversed. In this construction the water which runs from the upper inlet into the lower outlet of the main housing runs transversely to the electrodes as shown between the electrodes 9 and 10 and then runs along the electrodes as shown on the upper surface of the electrode 10, thus repeatedly changing its direction of running, transverse to and along the respective electrodes one after the other. At least positive electrodes are silver-containing and can be composed of actually pure silver. When the electrodes are supplied with current and water runs through the main housing 1 between its inlet and outlet and on its ways through the electrodes in the above described manner, it is saturated fast, continuously and effectively with ions of silver emerging from the positive electrodes (anodes). The silverized water is discharged then through the outlet for the respective use.

The negative electrodes (cathodes) can be composed for example of stainless steel. On the other hand, they can also be silver-containing, in which case the electrical charge of the electrodes can be periodically changed to provide a uniform silver depletion thereof.

Figure 7:
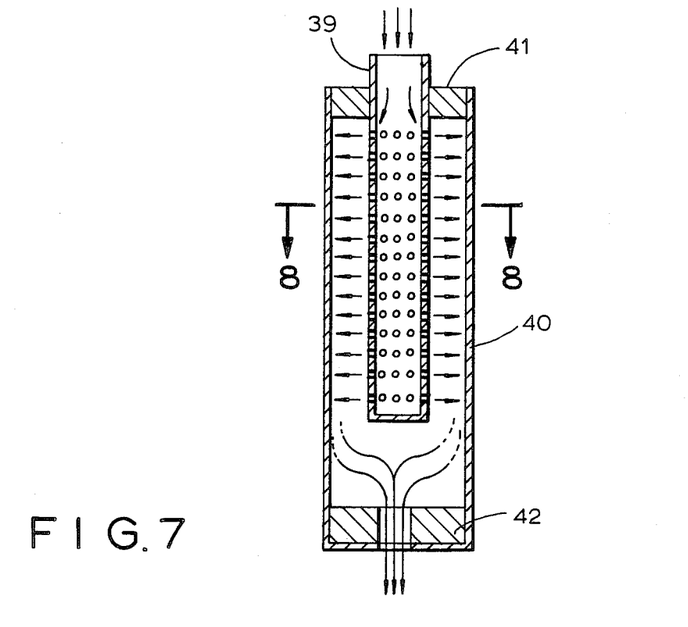
FIGS. 7 and 8 are views showing schematically a vertical section and a top view of the device in accordance with another embodiment of the invention.
Figure 8:
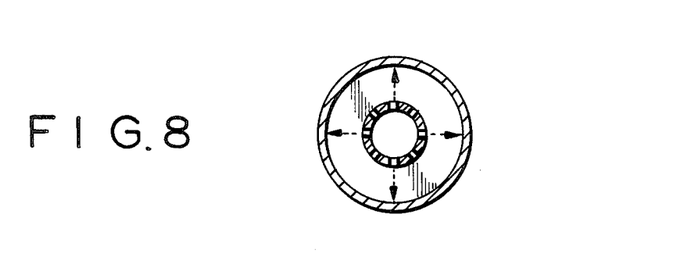

In FIGS. 7a and 7b the electrodes are formed in a different manner. An inner electrode 39 is formed as a pipe with a plurality of perforations and an outer electrode is 40 is also formed as a pipe concentrically surrounding the inner pipe. Plastic covers 41 and 42 close the ends of the main housing and are provided with the inlet and outlet. Water here also repeatedly runs transversely to and along the electrodes, being guided by them on its path between the inlet and outlet.

Figure 9:
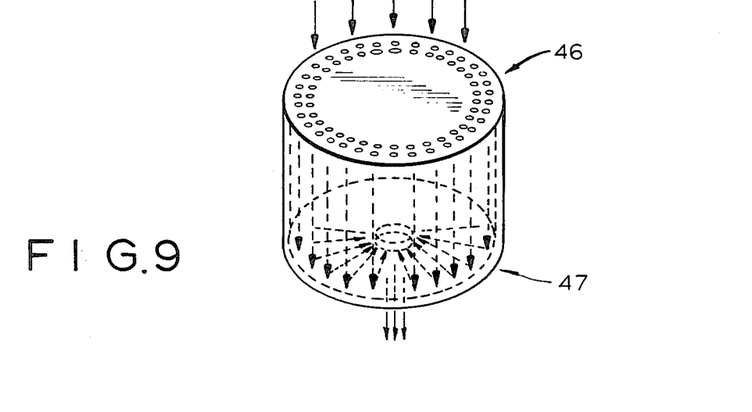
FIG. 9 is a schematic view of two electrodes of a further embodiment.

In FIG. 9 a positive electrode 46 has a plurality of openings arranged in several concentric rows, while a negative electrode 47 has a single central opening, to provide the above special path of water passing through the device between the inlet and the outlet of the main housing.

It is to be understood that the electrodes of each electrolythic pair can be also formed in a different manner; however, they have to be such as to provide the guidance of water on its way from the inlet to the outlet such that the water repeatedly changes its direction to flow transverse to and along the electrodes. The embodiment of FIG. 3 is advantageous since in it each electrode is used twice as an electrode of an upper pair and a lower pair.

The main housing can be formed of plastic, preferably of a transparent plastic. The electrodes can be pressed of pure silver. An electronic unit which will be described later on can be made as a printed circuit.

Figure 10:
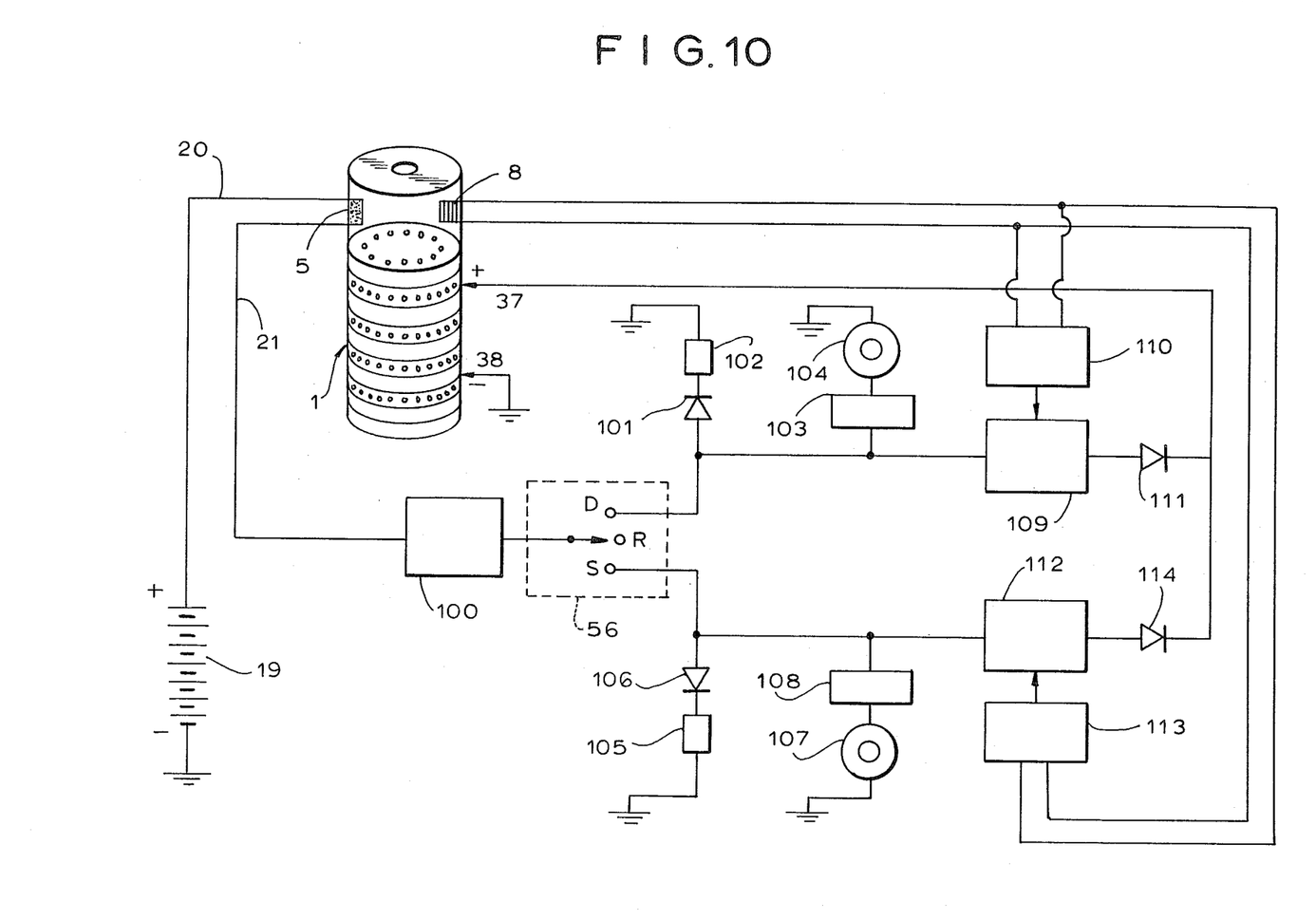
FIG. 10 shows a block-diagram of electronic control of the inventive device.

The electronic control unit is schematically shown in FIG. 10. It includes a portable battery for example of 8 v connected with the pressure switch 5 by a clamp 20. Clamp 21 connects the pressure switch 5 with a voltage regulator 100. A switching element 56 switches between three different modes of operation of the device, namely mode R or regular in which water flows through the device without saturation by silver ions, D or drinking in which water is saturated with a low concentration of silver ions which is allowed by respective drinking standards, and S or sterilizing in which water is saturated with higher concentration of silver ions required for sterilizing purposes. The upper branch in FIG. 10 implements the drinking mode while the lower branch implements the sterilizing mode. The upper branch includes a green light emitting diode 101, a resistor 102, a voice synthesizer 103 (chip), a piezoelectric buzzer 104, a current regulator 109 for example to regulate the current at the level of 10 milliamper, a thermoregulator 110 connected with the thermosensor 8 and a diode 111. The lower branch includes a resistor 105, a red light emitting diode 106, a piezoelectric buzzer 107, a voice synthesizer 108, a current regulator 112 for example to regulate current at the level of 100 milliamper, a thermoregulator connected with the thermosensor 8 and identified as 113, and a diode 114.

The above described electronic control unit provides for automatic operation and current intensity control of the electrodes. Supply voltage of the battery 19 is stabilized in a known manner by the stabilizer 110. Supply voltage is fed to the voltage regulator only through the pressure switch 5 which is activated by water pressure after connecting the device with a water source for example a water faucet. The stabilized voltage is supplied to the switching unit S which is set to the respective mode by a user. In the drinking mode in which drinking water must be saturated with silver of lower concentration the diode 101 emanates green light which can be visible for example through the indicator 4, the synthesizer 103 produces the sound "You can drink it" which is repeated during the time of operation of this mode, the current regulator 109 maintains maximum 10 mA current and works together with the thermoregulator 110 operating from the thermosensor 8 to maintain constant concentration of silver ions regardless of water temperature changes. More particularly the thermoregulator 110 automatically adjusts the current regulator 109, since otherwise water temperature changes would change its silver ions saturation values.

In the sterilize mode in which the water must be saturated with higher concentration of silver, the diode 106 emanates red light, the voice synthesizer produces the sound "Don't drink, this is for desinfection", the current regulator 112 together with the thermoregulator 113 control the current intensity to 100 mA maximum. In the regular mode the pressure switch 5 is blocked, the electronic unit is actually turned off, and water flows without saturation through the device.

Figure 11A:
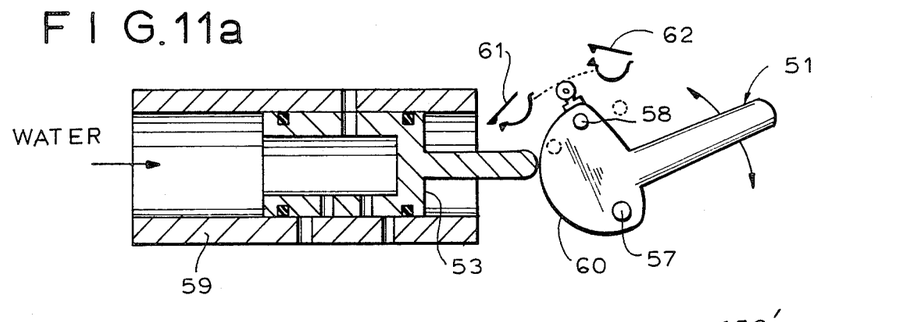
FIGS. 11a–11c show control unit of the inventive device in two embodiments, and a flow path.

FIG. 11a shows a mechanical design of the unit 56. The user grasps a handle 51 and turns an eccentric 60 which is turnable about an axis 57 between the regular, drinking and sterilize position and fixable in these positions for example by a spring-biases fixator 58. The ecentric closes the contacts 61 and 62 of the drinking or sterilizing modes respectively, and actuates the respective mode electrically. During turning of the eccentric it displaces, via a piston rod, a piston 53 provided with three openings which are alignable with three further openings in a cylinder 59, so as to supply regular water, low saturated drinking water and high saturated sterlizing water through the respective further opening of the cylinder.

Figures 12A, 13:
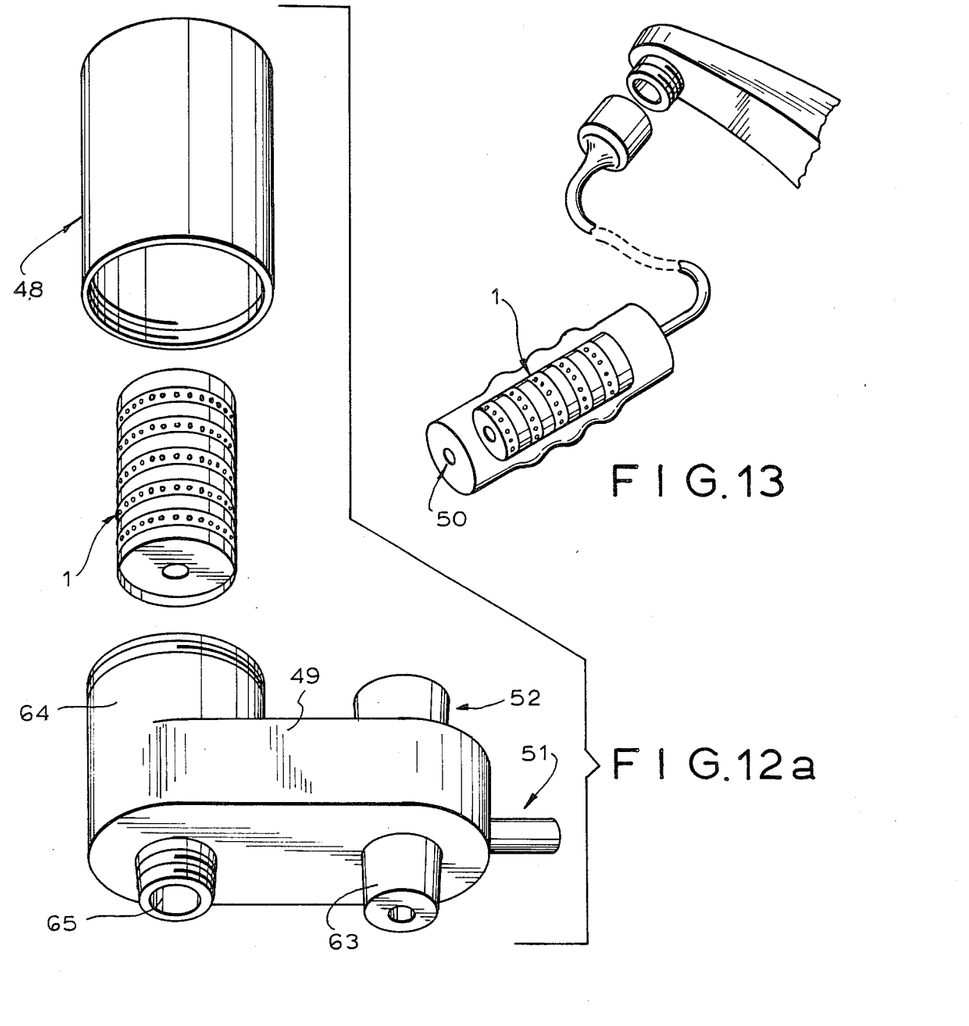
Figure 12B:
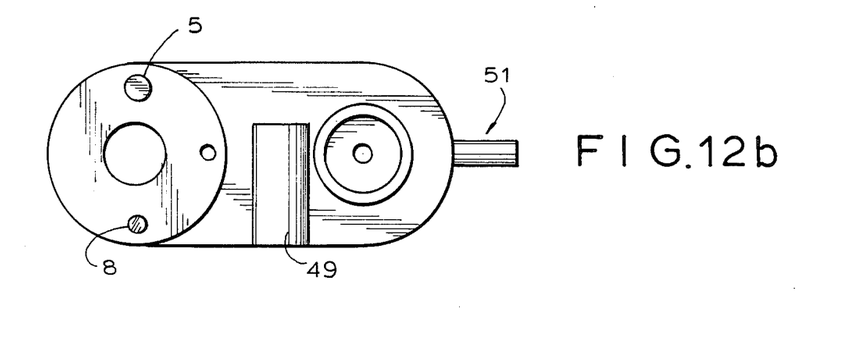

The cylinder 59 is arranged in a housing 49 in which the electrode set is inserted and which is closed by a threadable cover 48. The housing 49 is connectable by its inlet pipe 52 to a water faucet (FIGS. 12a–12c). In the regular mode the water flows out through the outlet pipe 63. In the drinking and sterlizing mode it flows around a transparent outer wall of the electrode set, upwardly between the wall, and a cylinder 64 and the cover and then enters the set from above, passes through the electrodes and issues from the outlet pipe 65. As can be seen from FIG. 12b the pressure switch 5 and the thermosensor 8 are mounted in the housing 49, and not in the main housing of the electrode set as in FIG. 4a. FIG. 13 shows that an additional housing can be formed as a handle which is easy to grasp by a user.

Figure 14A:
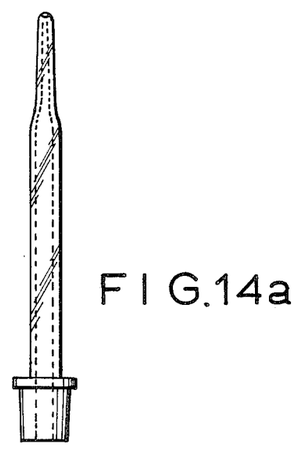
FIGS. 14a–14d show different attachment of the device.
Figure 14B:
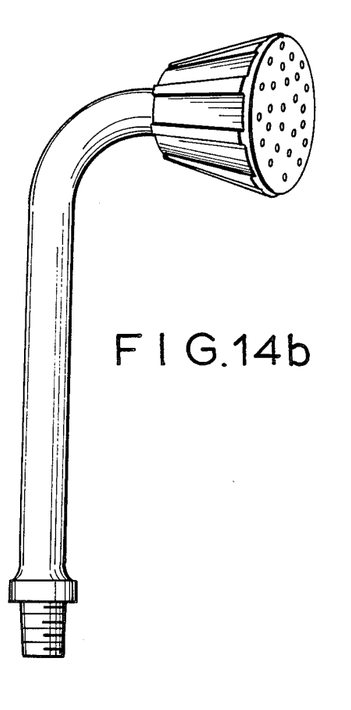
Figure 14C:
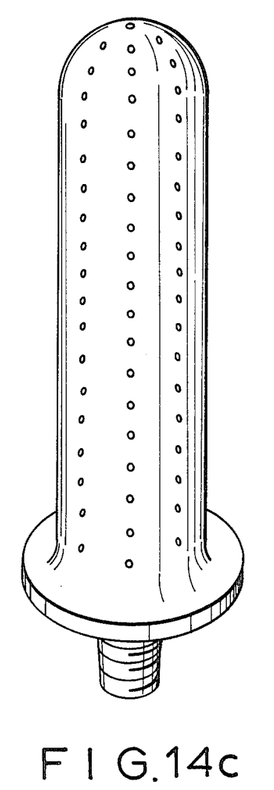
Figure 14D:
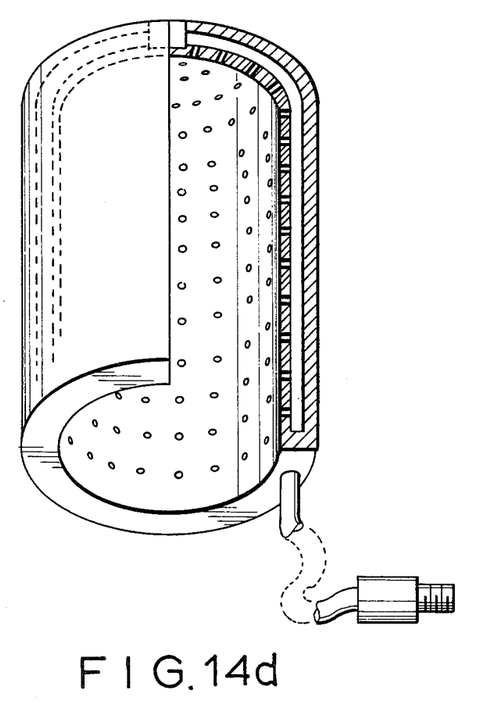

FIGS. 14a–14d shows nozzle-like attachements for desinfection of respective organs in the sterilizing mode. They are each attachable to the outlet of the main housing for example by threading. The attachement of FIG. 14a is pipe-like and can be used for desinfecting of a mouth. The attachement of FIG. 14b has an offset shower head and can be used for desinfecting of hands and body. The attachement of FIG. 14c is cylindrical and has a plurality of outlet openings in its wall to be used for desinfecting of anus or vagina. The attachement of FIG. 14d is cup shaped and also provided with a plurality openings in its inner wall, a single outlet in the apex and a solid outer wall, to desinfect penis.

Figure 1:
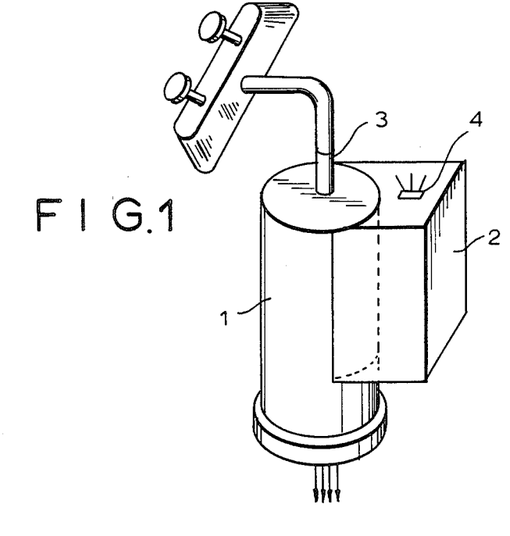
FIG. 1 is a general view of a device for silverizing water in accordance with the present invention.
Figure 2:
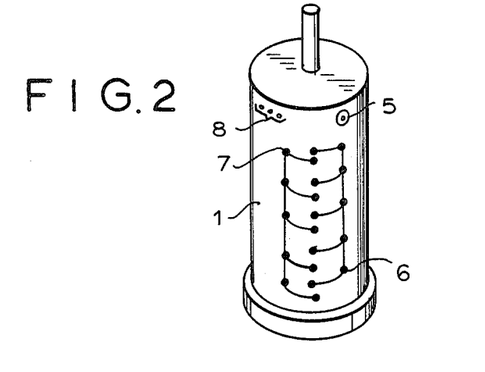
FIG. 2 is a side view of the silverizing device of FIG. 1.

It is to be understood that the device of FIGS. 1, 2 are preassembled finished article, while the device of FIGS. 12a–12c is based on a modular assembly principle in which the electrode set is inserted in the cartridge-like additional housing and protected by the cover.

The average desirable contents of silver in the drinking water can be max. 0.05 mg/l, while in the sterlizing water it can be for example 1–10. mg/l.

Current supply can be performed from battary (or network) through a convertor which produces pulse current with rectangular pulses to save energy, in which case current parameters can be: V=6v, I=10 mA or 100 mA. It is also possible to produce and supply to the electronic curcuit rectangular pulses with a change of polarity with the same parameter, to prevent polarization of electrodes.

Figure 11B:
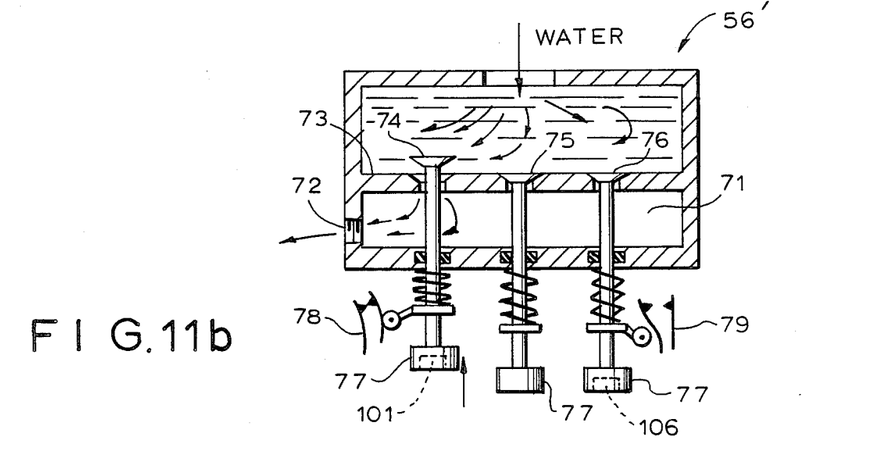
Figure 11C:
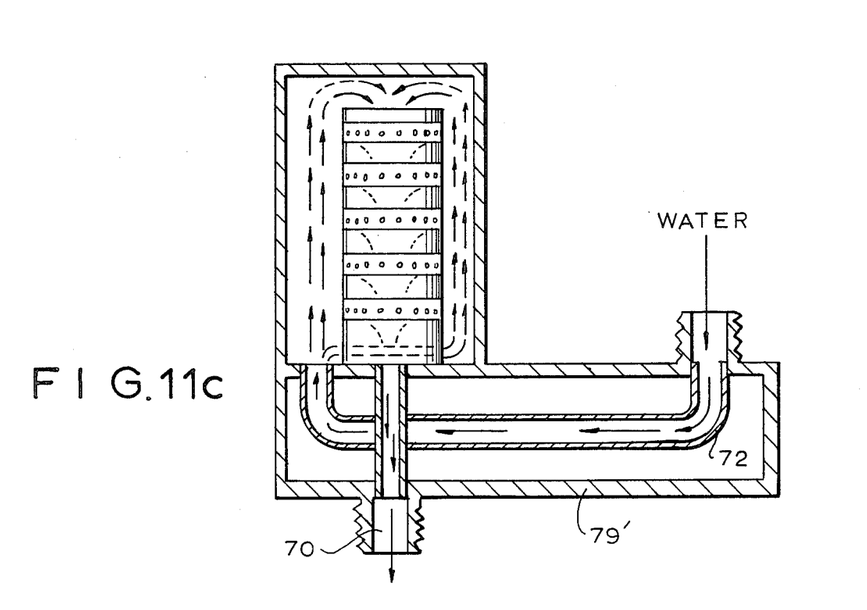

FIGS. 11b, 11c show another modification of the mechanical design of the unit 56'. A housing 71 is located in the housing 49' and its upper chamber communicates with the inlet for water. The outlet of the housing 71 is identified and 72. A partition 73 separates the upper chamber from the lower chamber and has three openings closable by valve member 74,75,76 which are movable by push buttons 77 via rods. Light emitting diode 101 of the drinking water is located in its button, while the light emitting diode 106 of the sterilizing water is located in its button. Contacts 78 and 79 for actuating the branches of the electronic control unit, for drinking water and sterilizing water are associated with the respective button. Upon pressing one of the buttons, production of drinking or sterilizing water is activated, and fresh water flows into the housing 71, then out of it through the outlet 72, then between the electrode set and the wall of the cylinder and cover, into the electrode set through its upper inlet, and finally discharged through a device outlet 70.

The invention is not limited to the details shown since various modifications and structural changes are possible without departing from its basic idea.

We claim:

1. A device for silverizing water, comprising passage forming means having an inlet, an outlet and a passage extending between said inlet and said outlet so that said inlet and said outlet are open during silverizing of water and water can run from said inlet to said outlet through said passage; and at least one pair of electrodes including a silver-containing anode and a cathode formed and located relative to one another and relative to said inlet and said outlet so that water running from said inlet to said outlet through said passage is guided by said electrodes to repeatedly change its direction so as to flow transversely to and along said electrodes to continuously saturate the water running from said inlet to said outlet with ions of silver emerging from said anode, said electrodes being formed as plates each having a central region and a peripheral region, one of said electrodes being provided with a central through channel, whereas the other of said electrodes is provided with a peripheral channel for passing the running water through said channels.

2. A device as defined in claim 1, wherein said peripheral channel of said other electrode is formed by a plurality of through opening in said peripheral region of said other electrode.

3. A device as defined in claim 1, wherein said central channel of said one electrode is formed by a plurality of through openings in said central region of said one electrode.

4. A device as defined in claim 1, comprising a plurality of such pairs of electrodes formed as such plates with such peripheral and central channels, said electrodes of said plurality of pairs being arranged so that the electrodes with said peripheral channel and the electrodes with said central channel are located in an alternating sequence.

5. A device as defined in claim 1; and further comprising current supplying means for supplying current to said electrodes and including a battery.

6. A device as defined in claim 1; and further comprising current supply means arranged to supply current to said electrodes; and current adjusting means actuatable by a user so as to adjust current supplied by said current supply means to at least two different current values alternatingly and thereby to adjust the quantity of silver ions discharged into the running water to at least two silverizing values alternatingly so as to obtain at said outlet either a higher silverized water or a lower silverized water.

7. A device for silverizing water, comprising passage forming means having an inlet, an outlet and a passage extending between said inlet and said outlet so that said inlet and said outlet are open during silverizing of water and water can run from said inlet to said outlet through said passage; and at least one pair of electrodes including a silver-containing anode and a cathode formed and located relative to one another and relative to said inlet and said outlet so that water running from said inlet to said outlet through said passage is guided by said electrodes to repeatedly change its direction so as to flow transversely to and along said electrodes to continuously saturate the water running from said inlet to said outlet by ions of silver emerging from said anode, one of said electrodes being formed as an inner pipe of a smaller diameter, the other of said electrodes being formed as an outer pipe of a greater diameter and surrounding said inner pipe, one of said pipes having a plurality of perforations.

8. A device as defined in claim 7, wherein said inner pipe having a plurality of perforations for passing the running water therethrough.

9. A device as defined in claim 7, wherein said outer pipe has a plurality of perforations for passing the running water therethrough.

10. A device as defined in claim 7; and further comprising means for removably attaching said passage forming means to a source of water so that water from the source flows into and through said inlet into said passage of said passage forming means.

11. A device for silverizing water, comprising passage forming means having an inlet, an outlet and a passage extending between said inlet and said outlet so that said inlet and said outlet are open during silverizing of water and water can run from said inlet to said outlet through said passage; at least one pair of electrodes including a silver-containing anode and a cathode formed and located relative to one another and relative to said inlet and said outlet so that water running from said inlet to said outlet through said passage is guided by said electrodes to repeatedly change its direction so as to flow transversely to and along said electrodes to continuously saturate the water running from said inlet to said outlet by ions of silver emerging from said anode; current supply means for supplying said electrodes with current; and pressure sensing means arranged to sense pressure of water and turn on said current supply means when water runs into said passage and its pressure is sensed by said pressure sensing means, so that said electrodes are current supplied only in the presence of water.

12. A device as defined in claim 11, wherein said electrodes are located so that they are offset relative to one another in a staggered manner to guide the running water over a meandering path between said electrodes.

13. A device as defined in claim 11, comprising a plurality of such pairs of electrodes arranged so that said electrodes are offset relative to one another in a staggered manner alternatingly after each other to guide the running water over a meandering path between the plurality of electrodes.

14. A device for silverizing water, comprising passage forming means having an inlet, an outlet and a passage extending between said inlet and said outlet so that said inlet and said outlet are open during silverizing of water and water can run from said inlet to said outlet through said passage; at least one pair of electrodes including a silver-containing anode and a cathode formed and located relative to one another and relative to said inlet and outlet so that water running from said inlet to said outlet through said passage is guided by said electrodes to repeatedly change its direction so as to flow transversely to and along said electrodes to continuously saturate the water running from said inlet to said outlet by ions of silver emerging from said anode; current supply means for supplying current to said electrodes; and temperature sensing means arranged to sense the temperature of the running water and control said current supply means so as to adjust the value of supplied current to the running water.

15. A device for silverizing water, comprising passage forming means having an inlet, an outlet and a passage extending between said inlet and said outlet so that said inlet and said outlet are open during silverizing of water and water can run from said inlet to said outlet through said passage; at least one pair of electrodes including a silver-containing anode and a cathode formed and located relative to one another and relative to said inlet and outlet so that water running from said inlet to said outlet through said passage is guided by said electrodes to repeatedly change its direction so as to flow transversely to and along said electrodes to continuously saturate the water running from said inlet to said outlet by ions of silver emerging from said anode; current supply means arranged to supply current to said electrodes; current adjusting means actuatable by a user so as to adjust current supplied by said current supply means to at least two different current values alternatingly and thereby to adjust the quantity of silver ions discharged into the running water to at least two silverizing values alternatingly so as to obtain at said outlet either a higher silverized water or a lower silverized water, said outlet including at least two outlet openings; and distributing means arranged to direct the higher silverized water to one of said outlet openings and the lower silverized water to the other of said outlet openings.

16. A device as defined in claim 15; and further comprising common switching means arranged to simultaneously act upon said current adjusting means and said distributing means.

17. A device as defined in claim 15, wherein said passage forming means with said electrodes together form a first unit, said distributing means forming a second unit which is attachable to said first unit.

18. A device for silverizing water, comprising passage forming means having an inlet, an outlet and a passage extending between said inlet and said outlet so that said inlet and said outlet are open during silverizing of water and water can run from said inlet to said outlet through said passage; at least one pair of electrodes including a silver-containing anode and a cathode formed and located relative to one another and relative to said inlet and outlet so that water running from said inlet to said outlet through said passage is guided by said electrodes to repeatedly change its direction so as to flow transversely to and along said electrodes to continuously saturate the water running from said inlet to said outlet by ions of silver emerging from said anode; a nozzle-shaped attachement which is shaped in correspondence with an organ to be treated with the silverized water and removably attachable to said outlet of said passage forming means.

19. A device for silverizing water, comprising passage forming means having an inlet, an outlet and a passage extending between said inlet and said outlet so that said inlet and said outlet are open during silverizing of water and water can run from said inlet to said outlet through said passage; at least one pair of electrodes including a silver-containing anode and a cathode formed and located relative to one another and relative to said inlet and outlet so that water running from said inlet to said outlet through said passage is guided by said electrodes to repeatedly change its direction so as to flow transversely to and along said electrodes to continuously saturate the water running from said inlet to said outlet by ions of silver emerging from said anode; a plurality of nozzle-shaped attachement members each shaped differently from the other and in correspondence with an organ to be treated by the silverized water and each removably attachable to said outlet of said passage forming means.

20. A device for silverizing water, comprising passage forming means having an inlet, an outlet and a passage extending between said inlet and said outlet so that said inlet and said outlet are open during silverizing of water and water can run from said inlet to said outlet through said passage; and at least one pair of electrodes including a silver-containing anode and a cathode formed and located relative to one another and relative to said inlet and outlet so that water running from said inlet to said outlet through said passage is guided by said electrodes to repeatedly change its direction so as to flow transversely to and along said electrodes to continuously saturate the water running from said inlet to said outlet by ions of silver emerging from said anode, said passage forming means being formed as a handle which is graspable by a user.

21. A device for silverizing water, comprising passage forming means having an inlet, an outlet and a passage extending between said inlet and said outlet so that said inlet and said outlet are open during silverixing of water and water can run from said inlet to said outlet through said passage; at least one pair of electrodes including a silver-containing anode and a cathode formed and located relative to one another and relative to said inlet and outlet so that water running from said inlet to said outlet through said passage is guided by said electrodes to repeatedly change its direction so as to flow transversely to and along said electrodes to continuously saturate the water running from said inlet to said outlet by ions of silver emerging from said anode; current supply means arranged to supply current to said electrodes; current adjusting means actuatable by a user so as to adjust current supplied by said current supply means to at least two different current values alternatingly and thereby to adjust the quantity of silver ions discharged into the running water to at least two silverizing values alternatingly so as to obtain at said outlet either a higher silverized water or a lower silverized water; and means for producing two different light colors in response to current adjustment by said current adjusting means to said two different values.

22. A device for silverizing water, comprising passage forming means having an inlet, an outlet and a passage extending between said inlet and said outlet so that said inlet and said outlet are open during silverizing of water and water can run from said inlet to said outlet through said passage; at least one pair of electrodes including a silver-containing anode and a cathode formed and located relative to one another and relative to said inlet and outlet so that water running from said inlet to said outlet through said passage is guided by said electrodes to repeatedly change its direction so as to flow transversely to and along said electrodes to continuously saturate the water running from said inlet to said outlet by ions of silver emerging from said anode; current supply means arranged to supply current to said electrodes; current adjusting means actuatable by a user so as to adjust current supplied by said current supply means to at least two different current values alternatingly and thereby to adjust the quantity of silver ions discharged into the running water to at least two silverizing values alternatingly so as to obtain at said outlet either a higher silverized water or a lower silverized water; and means for producing two different sounds in response to current adjustment by current adjusting means to said two current values.

* * * * *